(12) United States Patent
Keller et al.

(10) Patent No.: US 11,046,531 B2
(45) Date of Patent: Jun. 29, 2021

(54) TRANSPORT BAG AND METHOD FOR FILLING AND EMPTYING A TRANSPORT BAG OF THIS TYPE

(71) Applicant: FERAG AG, Hinwil (CH)

(72) Inventors: Martin Keller, Turbenthal (CH); Erich Kälin, Rapperwil (CH)

(73) Assignee: FERAG AG, Hinwil (CH)

( * ) Notice: Subject to any disclaimer, the term of this patent is extended or adjusted under 35 U.S.C. 154(b) by 339 days.

(21) Appl. No.: 15/773,482

(22) PCT Filed: Nov. 23, 2016

(86) PCT No.: PCT/CH2016/000146
§ 371 (c)(1),
(2) Date: May 3, 2018

(87) PCT Pub. No.: WO2017/088076
PCT Pub. Date: Jun. 1, 2017

(65) Prior Publication Data
US 2018/0312341 A1     Nov. 1, 2018

(30) Foreign Application Priority Data

Nov. 25, 2015  (CH) ........................... 1721/15
Oct. 27, 2016  (CH) ........................... 1438/16

(51) Int. Cl.
*B65G 47/61*     (2006.01)
*B65G 19/02*     (2006.01)
(Continued)

(52) U.S. Cl.
CPC ............. *B65G 47/61* (2013.01); *B65G 9/002* (2013.01); *B65G 9/004* (2013.01); *B65G 19/025* (2013.01);
(Continued)

(58) Field of Classification Search
None
See application file for complete search history.

(56) References Cited

U.S. PATENT DOCUMENTS

| 3,357,539 A | 12/1967 | Naslund et al. |
| 10,065,800 B2 * | 9/2018 | Auf Der Maur ...... B65G 17/20 |

(Continued)

FOREIGN PATENT DOCUMENTS

| DE | 397192 C | 6/1924 |
| DE | 692888 C | 6/1940 |

(Continued)

*Primary Examiner* — William R Harp
(74) *Attorney, Agent, or Firm* — Pauley Erickson & Swanson (57) ABSTRACT

A transport bag for the hanging transportation of goods by a transport device extending in a transport direction, the transport bag having a rear wall oriented in a transverse direction to the transport direction and a front wall oriented in a transverse direction to the transport direction, which are moveably connected to one another at an upper bag end and a lower bag end in such a way that the front wall can move relative to the rear wall between a filling position in which same is at a first distance to the rear wall, and an empty position in which same is at a second distance to the rear wall, which second distance is smaller than the first distance, and which transport bag can be connected in a hanging manner to the transport device by a connection means attached at the top on the rear wall.

28 Claims, 12 Drawing Sheets

(51) Int. Cl.
*B65G 9/00* (2006.01)
*B65B 25/20* (2006.01)

(52) U.S. Cl.
CPC ...... *B65B 25/20* (2013.01); *B65G 2201/0229* (2013.01)

(56) References Cited

U.S. PATENT DOCUMENTS

| | | | | |
|---|---|---|---|---|
| 10,252,866 | B2 * | 4/2019 | Ueda | B65G 17/20 |
| 10,301,114 | B2 * | 5/2019 | Fenile | B65G 9/004 |
| 10,336,548 | B2 * | 7/2019 | Fenile | B65G 17/20 |
| 10,494,184 | B2 * | 12/2019 | Sigrist | B65G 47/61 |
| 2018/0354728 | A1 * | 12/2018 | Sigrist | B65G 9/002 |
| 2019/0367282 | A1 * | 12/2019 | Stauber | B65G 17/485 |
| 2020/0062515 | A1 * | 2/2020 | Ramseier | B65G 17/20 |

FOREIGN PATENT DOCUMENTS

| | | |
|---|---|---|
| DE | 11 16 156 | 10/1961 |
| DE | 103 54 419 A1 | 6/2005 |
| DE | 10 2004 018 569 A1 | 11/2005 |
| DE | 10 2008 061 685 A1 | 6/2010 |
| DE | 10 2012 018 925 A1 | 3/2014 |
| DE | 10 2012 108 757 A1 | 3/2014 |
| DE | 10 2013 205 170 A1 | 9/2014 |
| EP | 0 638 501 A1 | 2/1995 |
| EP | 1 420 105 A1 | 5/2004 |
| EP | 1 693 322 A1 | 8/2006 |
| EP | 2 418 160 A1 | 2/2012 |
| WO | WO 2014/044601 A1 | 3/2014 |
| WO | WO 2016/030274 A1 | 3/2016 |
| WO | WO 2016/030275 A1 | 3/2016 |

* cited by examiner

TRANSPORT BAG AND METHOD FOR FILLING AND EMPTYING A TRANSPORT BAG OF THIS TYPE

BACKGROUND OF THE INVENTION

Field of the Invention

The present invention concerns the field of conveying technology and a transport bag for the hanging transportation of transport goods.

It also relates to a method for filling and emptying a transport bag of this type.

Discussion of Related Art

Hanging conveying systems on which transport goods are conveyed in suspended transport bags have been known in the prior art for a long time.

Document DE 10 2012 108 757 A1 describes a carrying bag for a hanging conveying device for the hanging transportation of objects, said carrying bag having a holding frame, a bag pouch which hangs on the holding frame and by which objects to be transported can be accommodated, and a hanging element which is connected to the holding frame and by means of which the carrying bag can be hung on the hanging conveying device in order to be transported in a hanging manner by the hanging conveying device. The bag pouch has a first pouch section and a second pouch section, which each have a first pouch end section connected to the holding frame and a second pouch end section remote from the holding frame, the second pouch end sections being connected to each other via a joint mechanism which can be brought into an unloading position in which the second pouch end sections are at a distance from each other so that the hag pouch is provided with an outlet opening formed between the two pouch end sections to discharge objects, and which can be brought into a loading position in which the second pouch end sections are adjacent to each other so that the outlet opening is closed and the bag pouch can receive objects. Document DE 10 2004 018 569 A1 discloses a collection apparatus for receiving objects, in particular items of clothing, for the sorting collection of the objects, having a collecting bag which substantially has a rack provided with a driving element which can be integrated in a conveying device, and a hag pouch hanging on the rack, the driving element and the rack being pivotable relative to each other about an axis lying transversely to the conveying direction; when the rack is arranged horizontally, the bag pouch is open, and when the rack is arranged vertically, the bag pouch is folded up and substantially closed.

Document DE 103 54 419 A1 discloses a hanging conveying apparatus for transporting conveyed goods, in particular items of clothing, having a plurality of conveyed-goods carriers which are or can be hung on a guide rail by means of a hook and can be transported on said guide rail along a conveying section, at least one of the conveyed-goods carriers having at least one bag for receiving conveyed goods, and the bag having at least one bag compartment which is delimited by a front wall and a rear wall which can be moved relative to each other in order to set the bag compartment in a step-by-step or continuous manner between a closed position and at least one open position; in the closed position, the front wall is largely close to the rear wall, and in the at least one open position, the front wall and the rear wall are remote from each other or, where applicable, spread apart from each other in comparison with the closed position.

Document DE 10 2012 018 925 A1 discloses a bag-type hanging conveying system having a hanging conveyor for transporting bags along a guide rail downstream in a conveying direction, the bags hanging perpendicularly below the guide rail when in a transport position, and the bags being substantially horizontal when in a loading position.

Also provided is a loading station which has a deflection apparatus, the deflection apparatus having an upstream end and a downstream end and being arranged under the guide rail of the hanging conveyor; during transport in the conveying direction, the bags come into contact with the deflection apparatus in order to turn the bags at least initially from the perpendicular transport position into the substantially horizontal loading position on continued transport in the conveying direction.

The bag has a hanging apparatus for pivotably coupling the bag to the guide rail of the hanging conveyor and a rear side which, in the perpendicular transport position, has an upper section and a lower section, the lower section adjoining the upper section in a longitudinal direction of the rear side, and a cover, a front and a bottom, the rear side being wider in the transverse direction than the cover, the front and the bottom so that the rear side has at least one wing region which projects laterally relative to the front and impacts the at least one pivot element to rotate the bag while the bag is transported through the loading station, and rests on the deflection apparatus in the loading position.

Important aspects when using such transport bags are the most simple and frictionless filling and emptying possible, which can be easily integrated into the proceeding conveying process, are not susceptible to faults and can be used flexibly for different transport goods. The basis for this is also the design of the bag itself.

SUMMARY OF THE INVENTION

It is therefore an object of the invention to create a transport bag which can be filled and emptied particularly simply and safely in conjunction with hanging conveyors.

It is also an object of the invention, in connection with a bag of this type, to specify a method for filling and a method for emptying a bag of this type.

The invention proceeds from a transport bag for the hanging transportation of transport goods by means of a transport device extending in a transport direction, which transport bag has a rear wall oriented in a transverse direction to the transport direction and a front wall oriented in a transverse direction to the transport direction, which are moveably connected to one another at an upper bag end and a lower bag end in such a way that the front wall can move relative to the rear wall between a filling position in which same is at a first distance to the rear wall, and an empty position in which same is at a second distance to the rear wall, which second distance is smaller than the first distance, and which transport bag can be connected in a hanging manner to the transport device by means of a connection means attached at the top on the rear wall.

It is characterised in that, in the region of the lower bag end, the rear wall has laterally arranged first guide elements for guiding the transport bag.

These guide elements can be cams, pins or differently localized elements. In particular, the first guide elements are in the form of first rolling elements.

In this case, the axes of the first rolling elements can be oriented transversely to the transport direction.

According to one embodiment of the invention, the rear wall can be dimensionally stable.

At the same time, the transport bag can also be frameless.

A particularly simple and effective solution for forming the transport bag is produced in this connection if the rear wall and front wall are sections of an integral hollow chamber plate which preferably consists of plastic, in particular polypropylene, and is folded twice at a suitable spacing transversely to the longitudinal direction of the hollow chambers to form the rear wall, front wall and bottom there between, in such a manner that the hollow chambers in the rear wall and front wall run vertically when the transport bag is hanging. The walls and the bottom of the bag are then connected pivotably to one another at the folds. The hollow chambers of the hollow chamber plate give the walls and bottom the necessary stability.

The rear wall can, however, also have a frame, which is preferably dimensionally stable.

One embodiment of the transport bag according to the invention is characterised in that, for the movable connection between the front wall and the rear wall, a dimensionally stable bracket is provided at the upper bag end, said bracket being mounted pivotably both on the front wall and on the rear wall. The bracket can be in the form of a closed bracket or else an open bracket.

Another embodiment of the transport bag according to the invention is characterised in that, for the movable connection between the front wall and the rear wall, a dimensionally stable lower frame or bracket and/or bottom is provided at the lower bag end, which are mounted pivotably both on the front wall and on the rear wall.

A further embodiment of the transport bag according to the invention is characterised in that the front wall has laterally arranged second rolling elements in the region of the upper bag end, to guide and/or influence the transport bag.

In particular, the axes of the second rolling elements can be oriented transversely to the transport direction.

Yet another embodiment of the transport bag according to the invention is characterised in that at least one access opening is provided in the front wall, through which access to the transport space inside the transport bag is possible. In this case, a bracket attached to the transport bag can be in the form of an open bracket.

A further embodiment of the transport hag according to the invention is characterised in that the transport bag is open at the sides.

However, the transport bag can also be at least partially closed at the sides.

The method according to the invention for filling the transport bag according to the invention is characterised in that, for opening, the transport bag hanging on the transport device is moved from the freely hanging vertical position by pivoting the rear wall in order to reach a filling position, so far towards a horizontal position in which the rear wall is above the front wall that the resulting distance between the rear wall and front wall is large enough for transport goods to be placed therein.

Another embodiment of the method according to the invention is characterised in that, to pivot the transport bag, the first guide elements or rolling elements of the rear wall are moved upwards relative to the transport device on a slotted guide.

In particular, the transport bag can be moved further in the transport direction, hanging on the transport device, to move the first guide elements or rolling elements on the slotted guide.

In particular, the first guide elements or rolling elements can lock into a locking depression in the slotted guide when the filling position intended for filling the transport bag is reached.

If the front wall has, in the region of the upper bag end, laterally arranged second rolling elements for guiding the transport bag, the axes of which are in particular oriented transversely to the transport direction, the front wall can be fixed in position by means of the second rolling elements when the position intended for filling the transport bag is reached.

A further embodiment of the method according to the invention is characterised in that the transport goods are introduced into the transport bag which is in the filling position.

In particular, means can be provided for introducing the transport goods into the transport hag.

If at least one access opening is provided in the front wall of the transport bag, other means for introducing the transport goods into the transport bag can also be provided.

In particular, at least one access opening, through which access to the transport space inside the transport bag is allowed, can be provided in the front wall of the transport bag, the means for introducing the transport goods comprising roller tracks and, to introduce the transport goods into the transport bag more easily, the transport bag being lowered onto the roller tracks in such a manner that the rollers of the latter protrude through the at least one access opening into the transport space.

The method according to the invention for emptying the transport bag according to the invention is characterised in that the transport bag hanging on the transport device is moved from the freely hanging vertical position by pivoting the rear wall in order to reach an emptying position, so far towards or beyond a horizontal position in which the rear wall is above the front wall that the transport goods in the transport bag can be conveyed out of the transport bag.

An embodiment of the method according to the invention is characterised in that, to pivot the transport bag, the first guide elements or rolling elements of the rear wall are moved upwards relative to the transport device on a slotted guide.

In particular, the transport bag can be moved further in the transport direction, hanging on the transport device, to move the first guide elements or rolling elements on the slotted guide.

In this case, the first guide elements or rolling elements can lock into a locking depression in the slotted guide when the emptying position is reached.

In particular, means can be provided for emptying the transport bag.

If at least one access opening, through which access to the transport space inside the transport bag is allowed, is provided in the front wall of the transport bag, and the means for inserting the transport goods comprise roller tracks, the transport bag, to unload the transport goods from the transport bag more easily, is lowered onto roller tracks in such a manner that the rollers of the latter protrude through the access openings into the transport space.

BRIEF DESCRIPTION OF SEVERAL VIEWS OF THE DRAWINGS

The invention is explained in more detail below using exemplary embodiments in conjunction with the drawing. In the figures.

DETAILED DESCRIPTION OF THE INVENTION

Figures 1, 2:
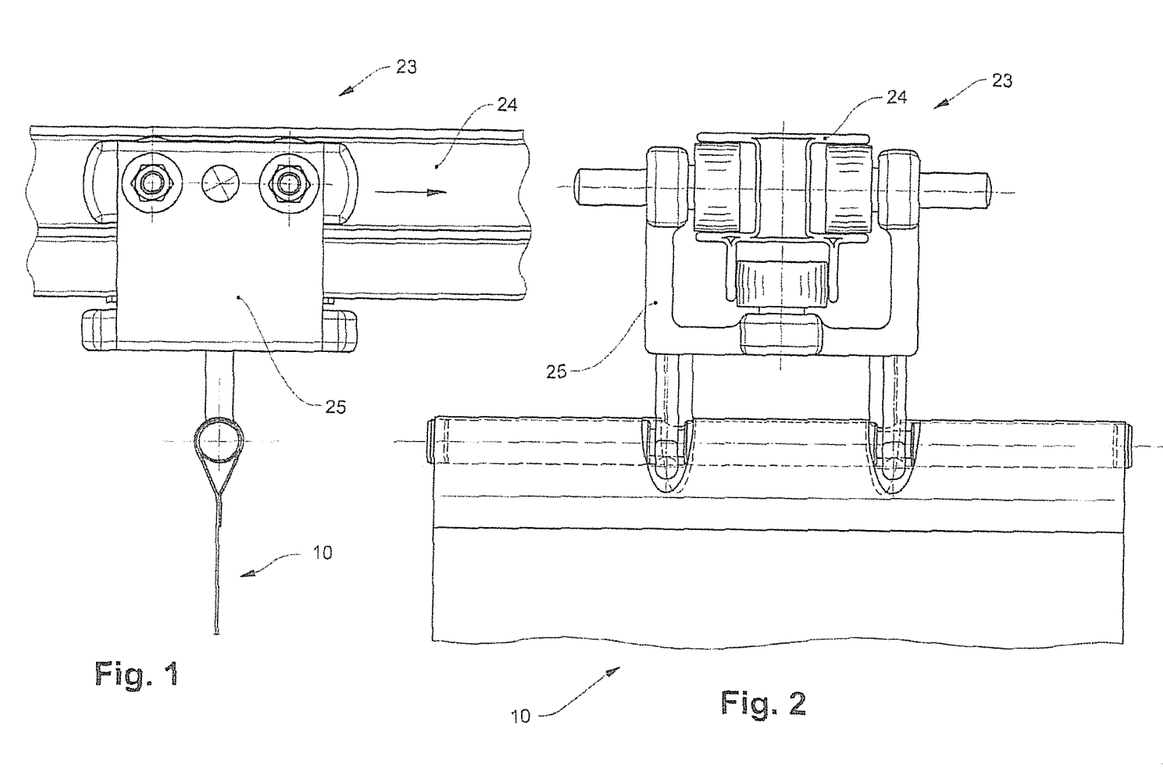
FIG. 1 shows a side view of an exemplary transport device as is suitable for transporting a bag according to the invention.
FIG. 2 shows the transport device from FIG. 1 in a transport direction.

FIG. 1 shows a side view of an exemplary transport device 23 in the form of a hanging conveyor, as is suitable for transporting a transport bag 10 according to the invention; FIG. 2 shows the transport device 23 of FIG. 1 as seen in a direction counter to the transport direction (arrow in FIG. 1). The transport device 23 comprises carriages 25 which are mounted movably on a running rail 24 by means of rollers and fit around the outside of the inner running rail 24. A transport device of this type is known, for example, from documents WO 2016/030275 A1 and WO 2016/030274 A1. The transport bag 10 is only indicated in the two figures.

Figure 3:
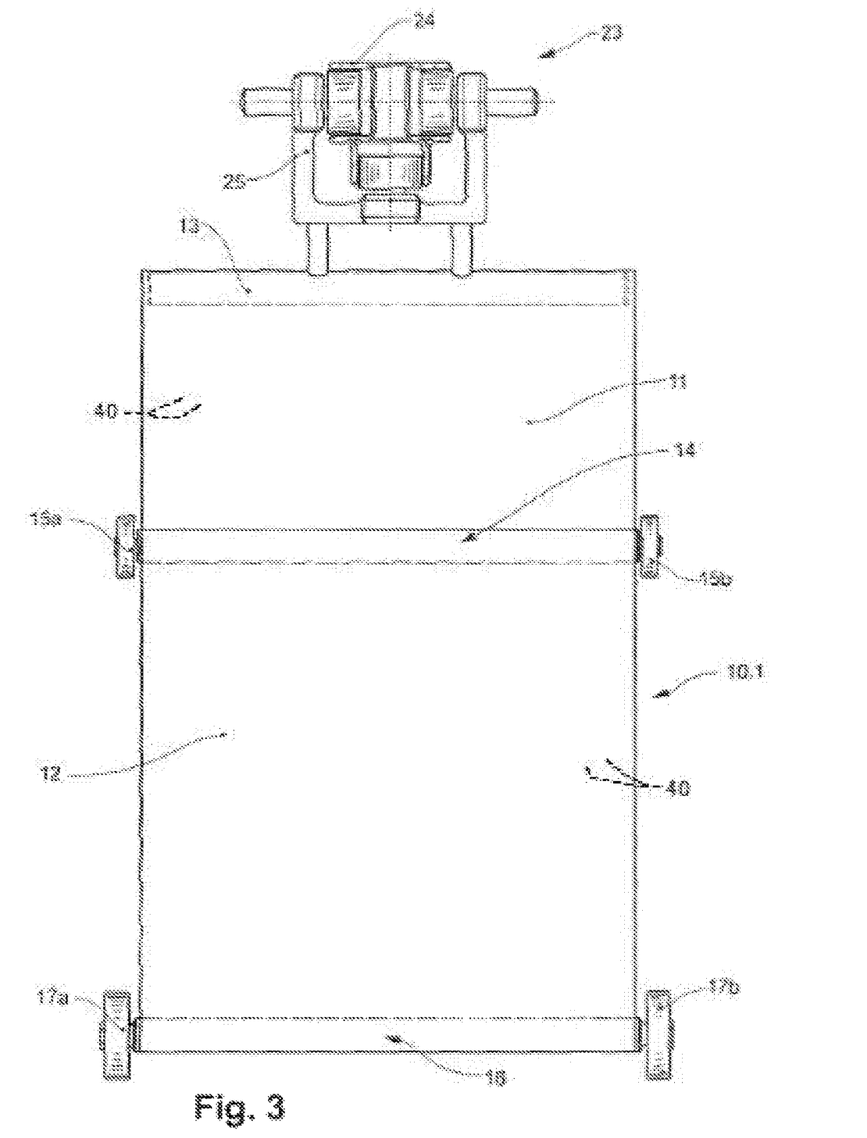
FIG. 3 shows a transport bag according to an exemplary embodiment of the invention, as seen counter to the transport direction.

FIG. 3 shows a first exemplary embodiment of a transport bag according to the invention. The transport bag 10.1 shown has a (raised) rear wall 11 and a front wall 12, which are both oriented transversely to the rail direction and conveying direction. The terms "front wall" and "rear wall" relate to the transport direction, the front wall 12 being in front of the rear wall 11 as seen in the transport direction. A connection means 13 is let into the upper region of the rear wall 11, said connecting means making it possible for the transport bag 10.1 to be fastened permanently or removably to a carriage 25 of the transport device in a hanging manner. In the example of FIG. 3, the connection means 13 comprises a transverse bar which extends over the entire width of the rear wall 11 and from which two vertical connection elements extend in the central region to the carriage 25.

The actual transporting volume of the transport bag 10.1 corresponds in height to the height of the front wall 12 and extends between an upper bag end 14 and a lower hag end 16. In the lower bag end 16, there are two guide elements in the form of rolling elements 17a and 17b arranged laterally opposite on the lower edge of the rear wall 11, the rotation axes of which are preferably oriented horizontally and transversely to the transport direction. The rolling elements 17a and 17b can in particular be rollers or wheels.

In the upper bag end 14, there are two rolling elements 15a and 15b arranged laterally opposite on the upper edge of the front wall 12, the rotation axes of which are likewise preferably oriented horizontally and transversely to the transport direction and which act to guide and/or influence the transport bag. The rolling elements 15a and 15b can also in particular be rollers or wheels. The arrangement of the rolling elements 15a, 15b and 17a, 17b is the same in the exemplary embodiment of FIG. 4.

So that the transport bag 10.1 can be brought simply and reliably into a certain position for filling and emptying and held there in the intended manner described in more detail below, it is expedient to maintain certain conditions in relation to the front wall 12 and rear wall 11 and their connection to each other. For instance, the rear wall 11 can be dimensionally stable. In this connection, "dimensionally stable" means that the rear wall 11 maintains its planar wall character even when the position of the transport bag changes. This can be achieved, for example, by the rear wall being in the form of a dimensionally stable plate at least partially consisting of plastic, metal or a wood-based material. This can be the case in particular if the rear wall 11 and front wall 12 are sections of an integral hollow chamber plate which preferably consists of plastic, in particular polypropylene (PP), and is folded twice at a suitable spacing transversely to the longitudinal direction of the hollow chambers 40 to form the rear wall 11, front wall 12 and bottom there between, in such a manner that the elongate hollow chambers 40 in the rear wall 11 and front wall 12 run vertically when the transport bag is hanging.

However, it is also conceivable for the rear wall to have merely a dimensionally stable frame covered with a woven fabric or a single or laminated film. The same applies to the front wall 12 of the transport hag 10.1.

The front wall 12 and the rear wall 11 should then be connected movably to each other in the region of the upper bag end 14 and in the region of the lower bag end 16. As can be seen better in the exemplary embodiment of the transport bag 10.2 shown in FIG. 4 owing to the perspective representation, a dimensionally stable, preferably rectangular bracket 1.8, which is mounted pivotably on both the front wall 12 and the rear wall 11, can be provided on the upper bag end 14 for the movable connection between the front wall 12 and the rear wall 11. The bracket 18 can have a closed form. However, it can also be open if interruptions are provided on the upper edge of the bag (see FIG. 5).

Likewise, a dimensionally stable, preferably rectangular frame 19 or bracket and/or a corresponding dimensionally stable bottom 19a, which are mounted pivotably on both the front wall 12 and the rear wall 11, can be provided on the lower bag end 16 for the movable connection between the front wall 12 and the rear wall 11. While the bracket 18 for filling and emptying the transport bag 10.1 or 10.2 through the upper bag end 14 is empty, the frame 19 can be covered with a woven fabric or a single or laminated film, in particular if there is no separate bottom. If front wall 12 and/or rear wall 11 are dimensionally stable per se, laterally arranged pivot arms can also be provided as a connection between the walls instead of a closed bracket 18 and frame 19 at the top and bottom. Corresponding pivot bearings or hinges are not shown in the drawings, however.

Figure 4:
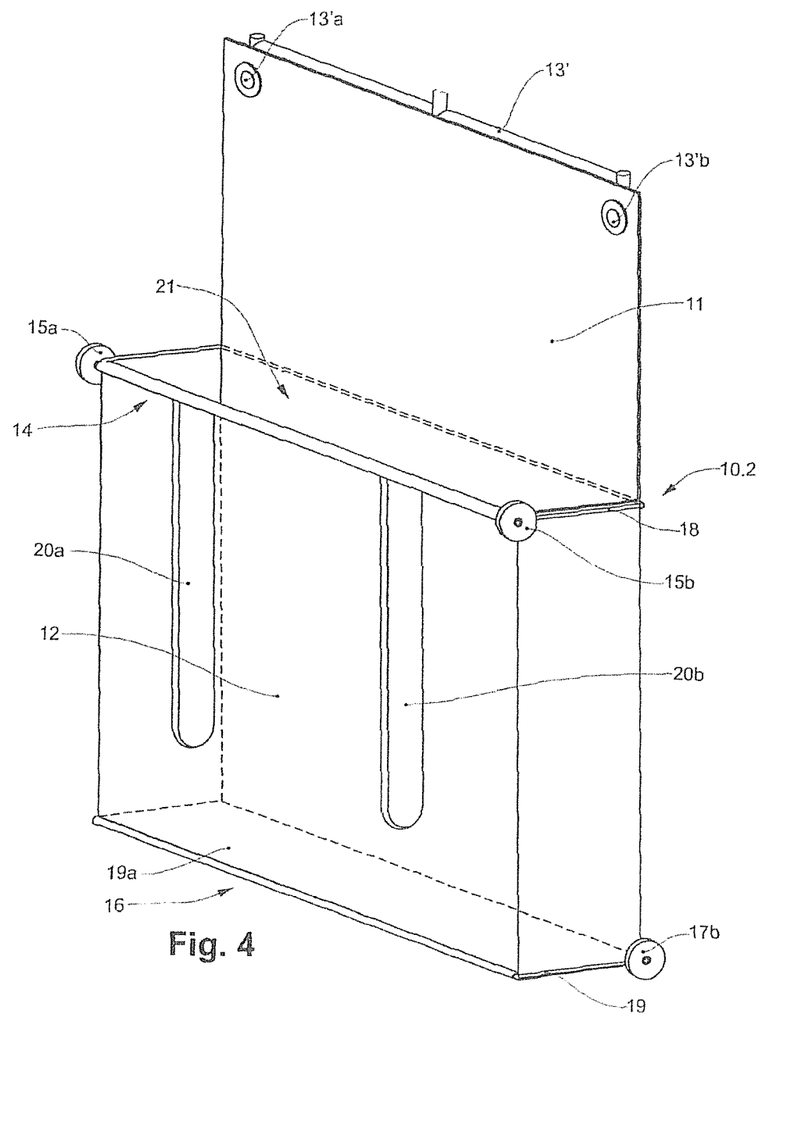
FIG. 4 shows a perspective side view of a transport bag according to another exemplary embodiment of the invention with two access openings in the front wall.

The transport bag 10.2 of FIG. 4 has a few differences from the transport bag 10.1 of FIG. 3: Firstly, a connection means 13' is provided which also has a transverse bar but is fastened to the rear wall 11 only at two edge-side points by means of fastening elements 13'a and 13'h (rivets, screw-fastenings with washers etc.). Secondly, the front wall 11 is dimensionally stable, in particular in the form of a plate, and has two vertical access openings 20a and 20b in the form of wide slots through which the inner or transport space 21 of the transport bag 10.2 can be accessed from the outside for certain purposes which are discussed in detail below. In the case of FIG. 4, the access openings 20a and 20b end at the upper (closed) bracket 18 of the transport bag 10.2. However, they can also be continuous, as in the transport bag 10.3 of FIG. 5, which makes access easier in certain cases. In this case, the bracket 18' is discontinuous.

Figure 6:
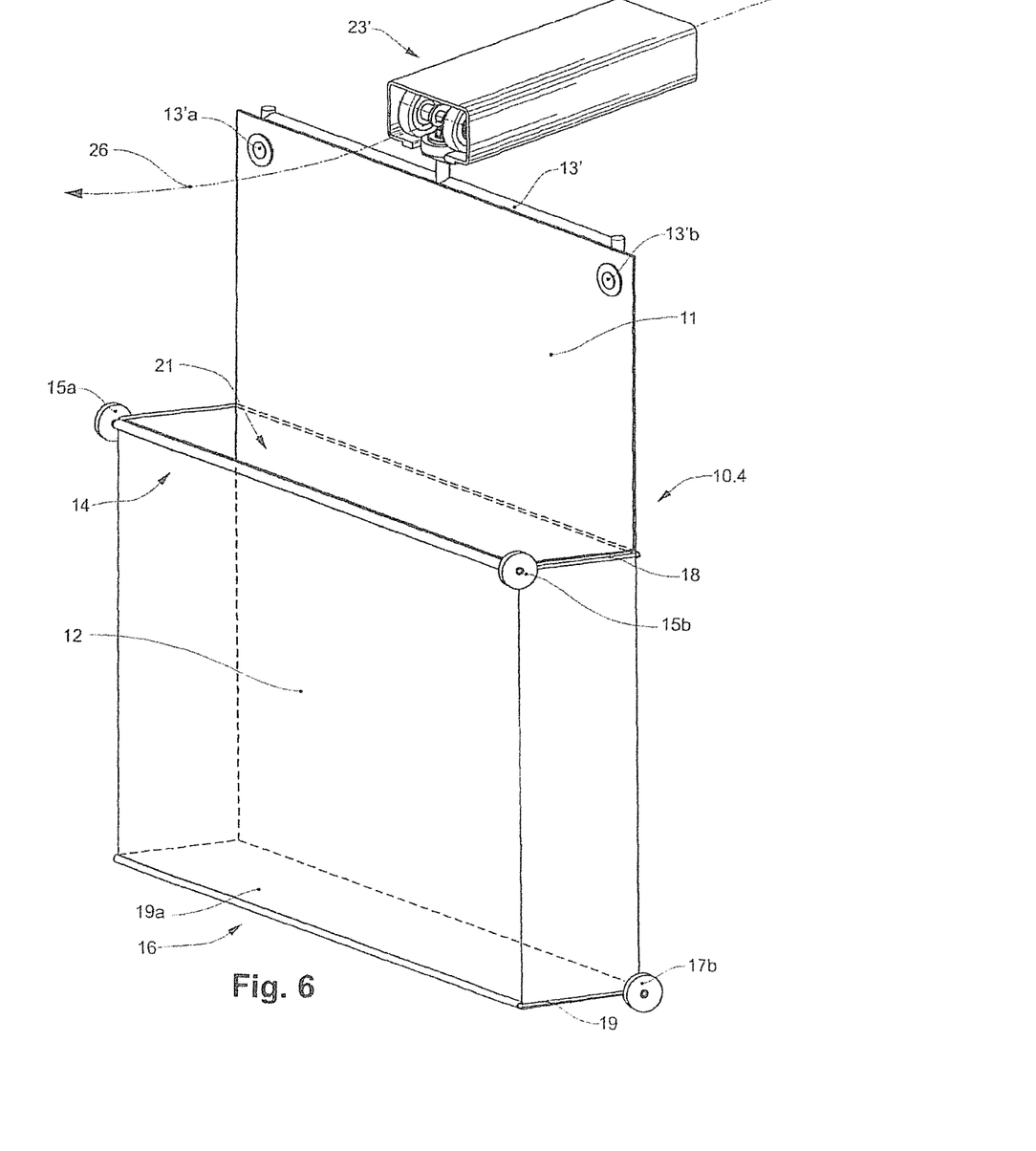
FIG. 6 shows a view comparable to FIG. 4 of a transport bag according to another exemplary embodiment of the invention together with a transport device.
Figure 7:
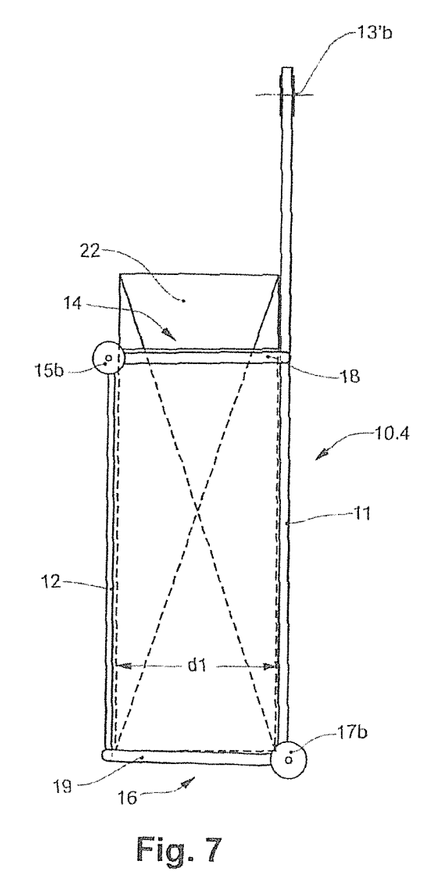
FIG. 7 shows a side view of the transport bag according to the invention filled with a package.
Figure 8:
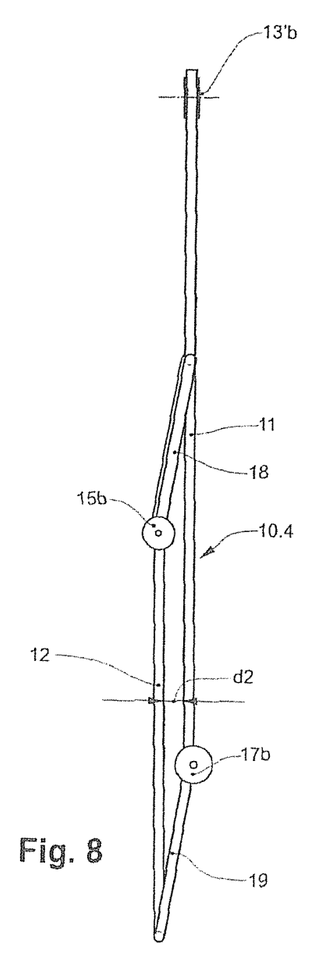
FIG. 8 shows the transport bag from FIG. 7 in an empty state.

For the transport bag 10.4, the orientation of the bag in relation to the transport direction 26 in the transport device 23' can be seen easily in FIG. 6. In this case, the transport device 23' has carriages or running elements which are mounted movably inside a running rail. Devices of this type are known, for example, from EP 1 693 322 A1. In this connection, it should be noted that the carriages or running elements of the transport devices or hanging conveyors 23, 23' are individually movable but can also be connected to each other in the running direction. FIGS. 7 and 8 show, in side view, how a transport bag 10.4 according to FIG. 6 changes its shape depending on whether the bag is full (FIG. 7) or empty (FIG. 8). In the full state, when the transport bag 10.4 has received transport goods 22, e.g. in the form of a cuboid package, the front wall 12, by corresponding pivoting, assumes a position relative to the rear wall 11 in which the front wall has a greater or smaller distance d1 from the rear wall 11, depending on the thickness of the transport goods 22. This distance d1 is greatest when the bracket 18 and frame 19 lie horizontally. In the empty state (FIG. 8), the front wall 12 folds downwards in a parallelogram configuration by pivoting of the bracket 18 and frame 19 under the force of gravity and therefore takes up less space when the empty bags are kept in a storage position or parked position for further transport tasks. The distance between the front wall 12 and the rear wall 11 then assumes its minimum value d2.

Figure 9:
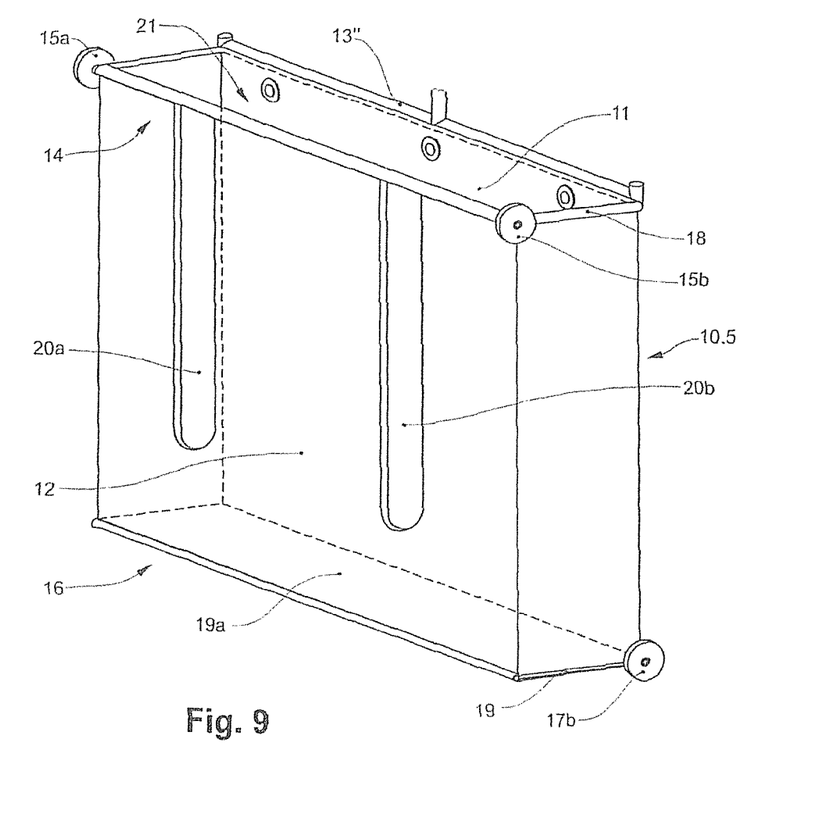
FIG. 9 shows a view comparable to FIG. 4 of a transport bag according to another exemplary embodiment of the invention together with a shortened rear wall.

Whereas the rear wall 11 regularly projected considerably beyond the front wall 12 in the previous exemplary embodiments of the transport bags according to the invention, in the exemplary embodiment according to FIG. 9, the rear wall 11 of the transport bag 10.5 ends at the same height as the front wall 12. The connection means 13" is also somewhat changed in this case in that it has three fastening elements distributed over the width. Of course, further fastening points and fastening elements can be provided, in particular for higher transport loads.

Figure 10:
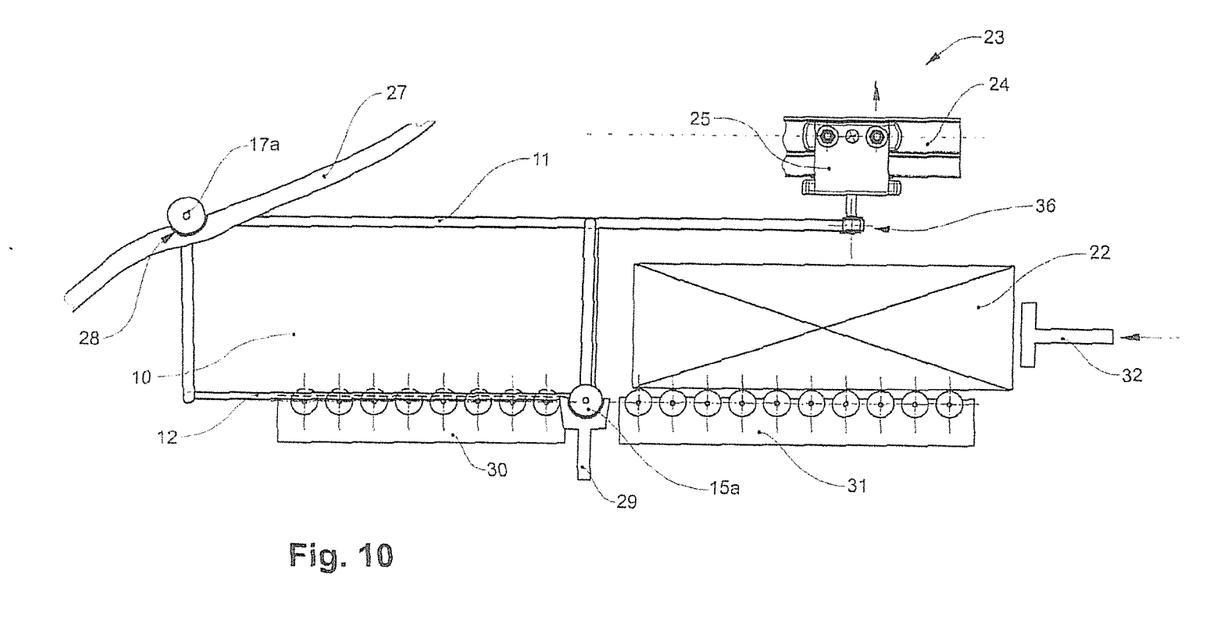
FIG. 10 shows a first step in a possible filling process for a transport bag according to the invention.
Figure 11:
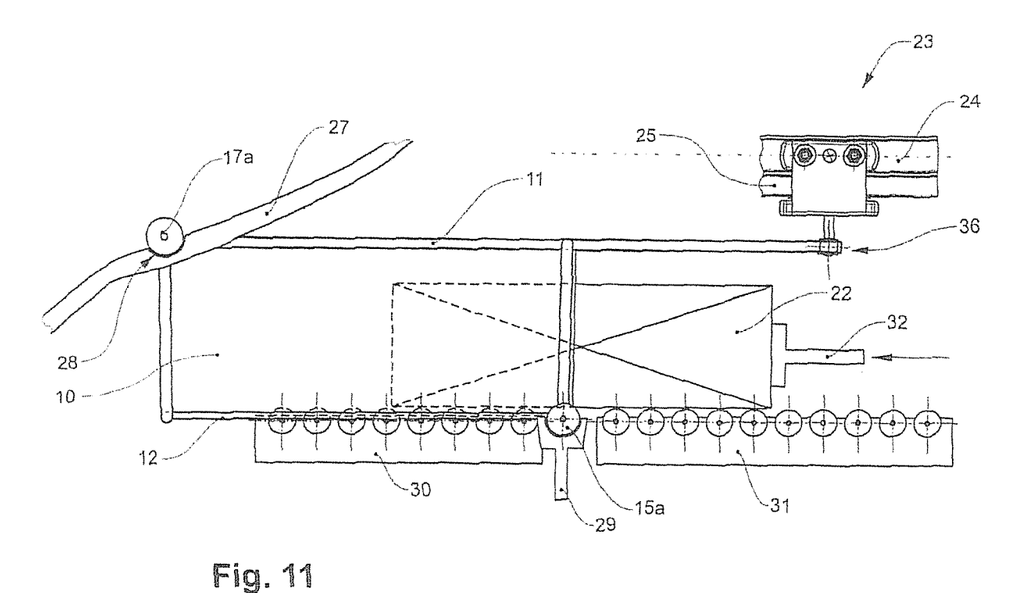
FIG. 11 shows a second step, following FIG. 10, in a possible filling process for a transport bag according to the invention.
Figure 12:
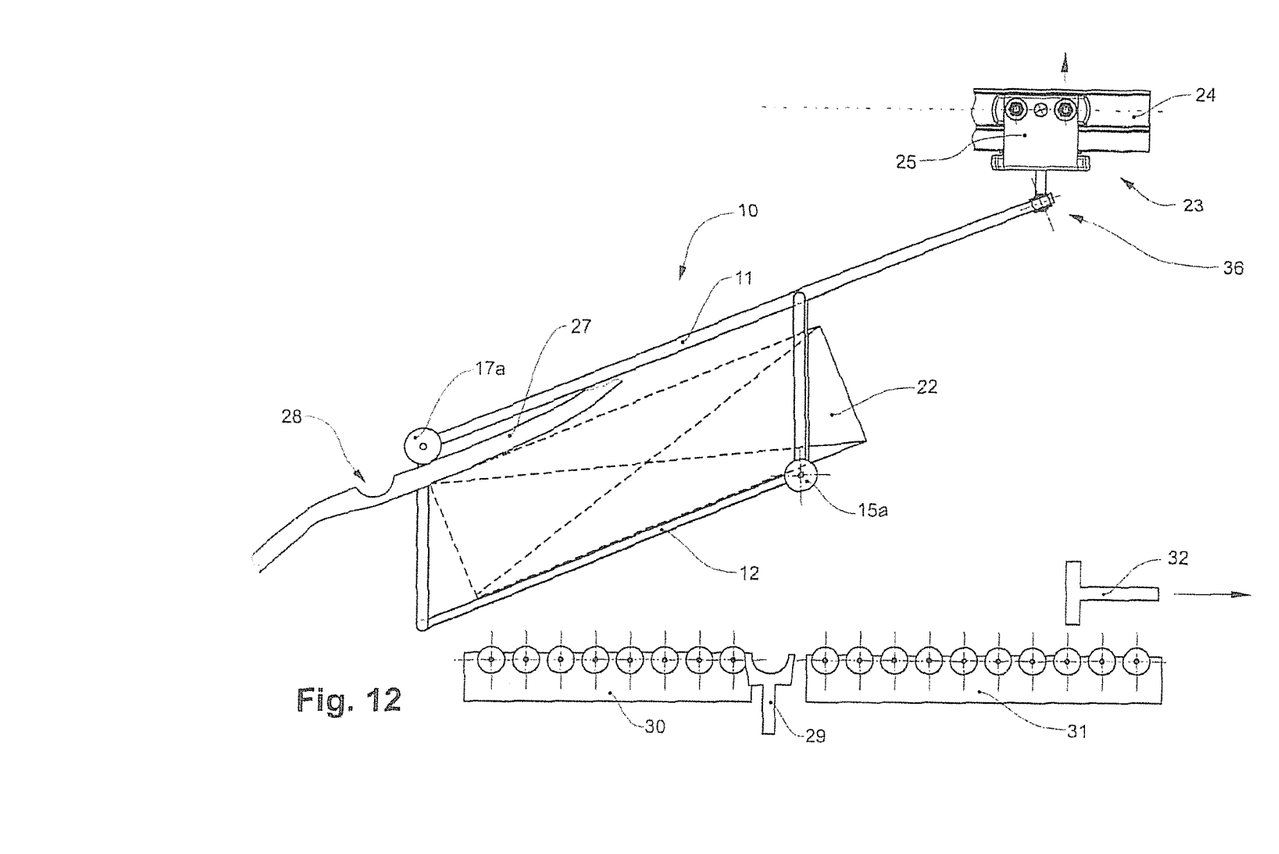
FIG. 12 shows a third step, following FIG. 11, in a possible filling process for a transport bag according to the invention.

FIGS. 10 to 12 show an exemplary embodiment of the method according to the invention for filling a transport bag 10 of the described type in a schematically simplified manner in multiple steps. In the first step according to FIG. 10, the transport bag is tilted from the hanging, vertical position into a filling position in that the bag is moved upwards relative to the transport device 23 with the rolling elements 17a and 17b on the lower end of the rear wall 11 on a rising slotted guide 27 until the rolling elements 17a and 17b move into corresponding locking depressions 28 in the slotted guide 27 and lock the transport bag 10 in this position when further transport is interrupted at the same time. The tilting is make possible e.g. by a joint connection 36 between the connection means and the carriage 25.

Figure 5:
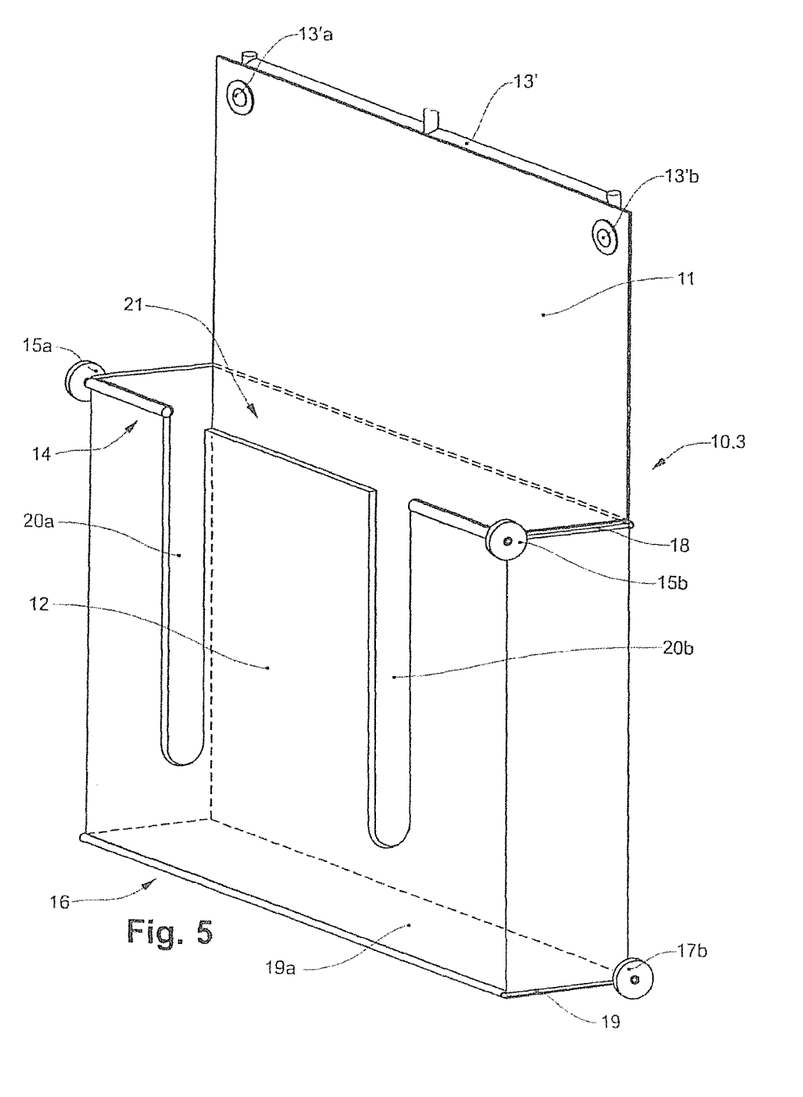
FIG. 5 shows a view comparable to FIG. 4 of a transport bag according to a further exemplary embodiment of the invention with two access openings, which are open at the top, in the front wall.

In this configuration, if corresponding access openings 20a and 20b according to FIG. 4 or 5 are present in the wall 11 at the bottom, a correspondingly configured roller track 30 can be brought with its rollers through the access openings 20a and 20b into the interior of the bag in order to allow transport goods 22 to be inserted easily, sliding on the rollers. So that the front wall 12 also remains stably in position in this configuration, a fixing device 29 can previously fix the front wall 12 by the rolling elements 15a and 15b thereof.

The transport goods 22 can be brought e.g. horizontally by means of a further roller track 31 (FIG. 10) and then e.g. inserted into the horizontal, open transport bag 10 by means of a pushing mechanism 32. However, it is also conceivable to provide motor-driven rollers in the roller tracks 30 and/or 31 for insertion.

If the transport goods 22 are fully accommodated by the transport bag 10 (the transport goods can project out of the top of the bag), the transport bag according to FIG. 12 is brought away from the roller tracks back into the hanging vertical position in that e.g. the pushing mechanism 32 is retracted, the transport device 23 is moved upwards, and at the same time the carrying bag 10 is moved upwards on the slotted guide 27 and is lifted off from the roller track 30.

Figure 13:
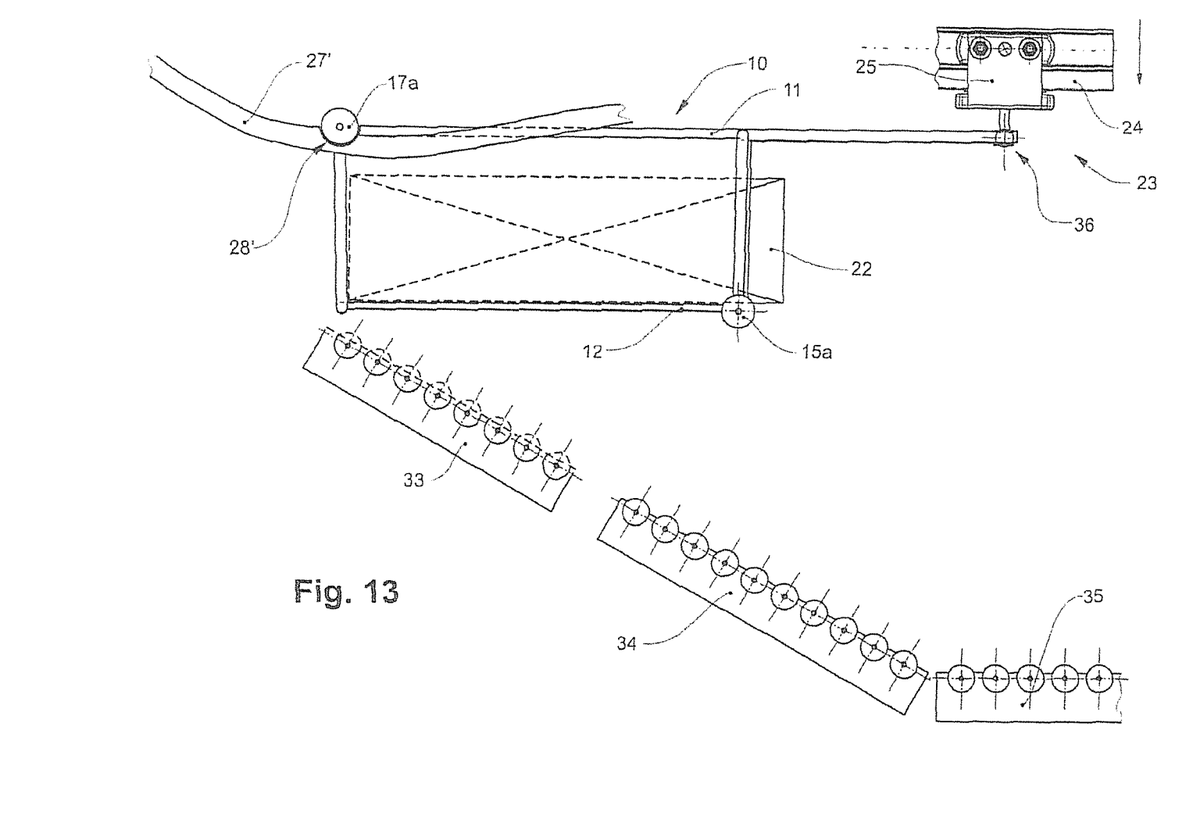
FIG. 13 shows a first step in a possible emptying process for a transport bag according to the invention.
Figure 14:
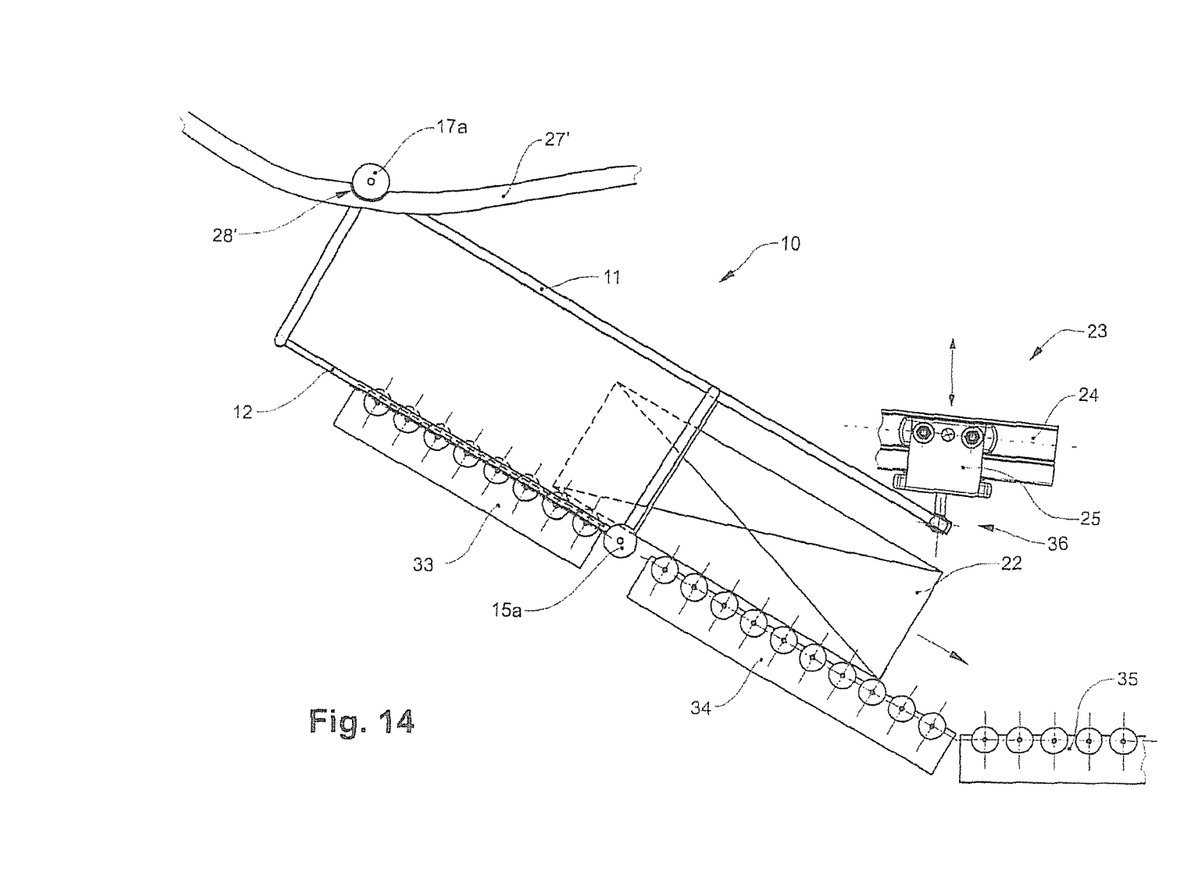
FIG. 14 shows a second step, following FIG. 13, in a possible emptying process for a transport bag according to the invention.

To empty the transport bag, according to FIGS. 13 and 14, the filled transport bag 10 hanging on the transport device 23 is moved from the freely hanging vertical position by pivoting the rear wall 11 in order to reach an emptying position, so far towards a horizontal position in which the rear wall 11 is above the front wall 12 that the transport goods 22 in the transport bag 10 can be conveyed, e.g. obliquely downwards, out of the transport bag 10 (FIG. 14). To this end, the rolling elements 17a and 17b of the rear wall 11 are moved upwards relative to the transport device 23 on a slotted guide 27', while the transport bag 10 is moved further in the transport direction, hanging on the transport device 23. In the process, the rolling elements 17a, 17b, on reaching the emptying position intended for emptying the transport bag 10, lock into a locking depression 28' in the slotted guide 27' (FIG. 13). Then, by lowering the transport device 23, the transport bag 10 is tilted with the upper opening further downwards and at the same time brought into engagement through the access openings 20a and 20b with a first roller track of a series of roller tracks 33, 34 and 35 on which the transport goods 22 can then roll out of the transport bag 10 and be transported further to a discharge point.

The invention claimed is:

1. A transport bag (10; 10.1-10.5) for the hanging transportation of transport goods (22) by means of a transport device (23, 23') extending in a transport direction (26), the transport bag (10; 10.1-10.5) comprising:
   a rear wall (11) oriented in a transverse direction to the transport direction (26);
   a front wall (12) oriented in a transverse direction to the transport direction (26), wherein the rear wall (11) and the front wall (12) are moveably connected to one another at an upper bag end (14) and a lower bag end (16) in such a way that the front wall (12) can move relative to the rear wall (11) between a filling position in which the front wall (12) is at a first distance (d1) to the rear wall (11), and an empty position in which the front wall (12) is at a second distance (d2) to the rear wall (11), which second distance is smaller than the first distance (d1);
- a connection means (13, 13', 13") connecting the transport bag (10; 10.1-10.5) in a hanging manner to the transport device (23, 23') attached at the top on the rear wall (11); and
- laterally arranged first guide elements (17a, 17b) on the rear wall (11) in a region of the lower bag end (16) for guiding the transport bag (10; 10.1-10.5), wherein the first guide elements (17a, 17b) comprise cams, pins, or rolling elements.

2. The transport bag according to claim 1, wherein the first guide elements are in the form of first rolling elements (17a, 17b).

3. The transport bag according to claim 2, wherein the axes of the first rolling elements (17a, 17b) are oriented transversely to the transport direction (26).

4. The transport bag according to claim 1 wherein the rear wall (11) is dimensionally stable.

5. The transport bag according to claim 4, wherein the transport bag (10; 10.1-10.5) is frameless.

6. The transport bag according to claim 5, wherein the rear wall (11) and front wall (12) are sections of an integral hollow chamber plate having hollow chambers and that is folded twice at a suitable spacing transversely to the longitudinal direction of the hollow chambers to form the rear wall (11), the front wall (12) and a bottom therebetween, in such a manner that the hollow chambers in the rear wall (11) and front wall (12) run vertically when the transport bag is hanging.

7. The transport bag according to claim 1, wherein the rear wall (11) has a frame, which is dimensionally stable.

8. The transport bag according to claim 1, wherein for the movable connection between the front wall (12) and the rear wall (11), a dimensionally stable bracket (18) is provided at the upper bag end (14), said bracket being mounted pivotably both on the front wall (12) and on the rear wall (11).

9. The transport bag according to claim 1, wherein a dimensionally stable frame (19) or bottom (19a) is mounted pivotably on both the front wall (12) and the rear wall (11) on the lower bag end (16) for the movable connection between the front wall (12) and the rear wall (11).

10. The transport bag according to claim 1, wherein in the region of the upper bag end (14), the front wall (12) has laterally arranged second rolling elements (15a, 15b) for guiding and/or influencing the transport bag (10; 10.1-10.5).

11. The transport bag according to claim 10, wherein the axes of the second rolling elements (15a, 15b) are oriented transversely to the transport direction (26).

12. The transport bag according to claim 1, wherein at least one access opening (20a, 20b) is provided in the front wall (12), through which access to a transport space (21) inside the transport bag (10; 10.1-10.5) is possible.

13. The transport bag according to claim 1, wherein the transport bag (10; 10.1-10.5) is open at the sides.

14. The transport bag according to claim 1, wherein the transport bag (10; 10.1-10.5) is at least partially closed at the sides.

15. A method for filling the transport bag according to claim 1, comprising moving the transport bag (10, 10.1-10.5) hanging on the transport device (23, 23') from a freely hanging vertical position by pivoting the rear wall (11) in order to reach the filling position in a horizontal position in which the rear wall (11) is above the front wall (12) that the resulting distance between the rear wall (11) and front wall (12) is large enough for transport goods (22) to be placed therein.

16. The method according to claim 15, further comprising pivoting the transport bag (10; 10.1-10.5) by moving the first guide elements (17a, 17b) of the rear wall (11) upwards relative to the transport device (23, 23') on a slotted guide (27).

17. The method according to claim 16, wherein moving the first guide elements (17a, 17b) on the slotted guide (27) comprises moving the transport bag (10; 10.1-10.5) further in the transport direction (26), hanging on the transport device (23, 23').

18. The method according to claim 16, comprising locking the first guide elements (17a, 17b) into a locking depression (28) in the slotted guide (27) when the filling position intended for filling the transport bag (10; 10.1-10.5) is reached.

19. The method according to claim 18, wherein the front wall (12) includes, in the region of the upper bag end (14), laterally arranged second rolling elements (15a, b) for guiding and/or influencing the transport bag (10; 10.1-10.5), axes of which are oriented transversely to the transport direction (26), and the front wall (12) is fixed in position by means of the second rolling elements (15a, b) when the position intended for filling the transport bag (10; 10.1-10.5) is reached.

20. The method according to claim 15, wherein the transport goods (22) are introduced into the transport bag (10; 10.1-10.5) is in the filling position.

21. The method according to claim 20, wherein means (30, 31, 32) are provided for introducing the transport goods (22) into the transport bag (10; 10.1-10.5).

22. The method according to claim 21, wherein at least one access opening (20a, 20b), through which access to the transport space (21) inside the transport bag (10; 10.1-10.5) is allowed, is provided in the front wall (12) of the transport bag (10; 10.1-10.5), the means for introducing the transport goods (22) comprise roller tracks (30) and, to introduce the transport goods (22) into the transport bag (10; 10.1-10.5) more easily, the transport bag (10; 10.1-10.5) is lowered onto the roller tracks (30) in such a manner that the rollers of the latter protrude through the at least one access opening (20a, 20b) into the transport space (21).

23. A method for emptying the transport bag according to claim 1, comprising moving the transport bag (10, 10.1-10.5) hanging on the transport device (23, 23') is moved from a freely hanging vertical position by pivoting the rear wall (11) in order to reach an emptying position towards or beyond a horizontal position in which the rear wall (11) is above the front wall (12) so that the transport goods (22) in the transport bag (10; 10.1-10.5) can be conveyed out of the transport bag (10; 10.1-10.5).

24. The method according to claim 23, further comprising pivoting the transport bag (10; 10.1-10.5) by moving the first guide elements (17a, 17b) of the rear wall (11) upwards relative to the transport device (23, 23') on a slotted guide (27').

25. The method according to claim 24, wherein the moving the first guide elements (17a, 17b) on the slotted guide (27') comprises moving the transport bag (10; 10.1-10.5) further in the transport direction (26), hanging on the transport device (23, 23').

26. The method according to claim 24, further comprising locking the first guide elements (17a, 17b) into a locking depression (28') in the slotted guide (27') when the emptying position of the transport bag (10; 10.1-10.5) is reached.

27. The method according to claim 23, wherein means (30) are provided for emptying the transport bag (10; 10.1-10.5).

28. The method according to claim 27, wherein at least one access opening (20a, 20b), through which access to the transport space (21) inside the transport bag (10; 10.1-10.5) is allowed, is provided in the front wall (12) of the transport bag (10; 10.1-10.5), the means for emptying the transport bag (10; 10.1-10.5) comprise roller tracks (30) and, to unload the transport goods (22) from the transport bag (10; 10.1-10.5) more easily, the transport bag (10; 10.1-10.5) is lowered onto the roller tracks (30) in such a manner that the rollers of the latter protrude through the access openings (20a, 20b) into the transport space (21).

* * * * *